(12) United States Patent
Lu et al.

(10) Patent No.: US 6,779,234 B1
(45) Date of Patent: Aug. 24, 2004

(54) ELASTIC HINGE FOR A NOTEBOOK COMPUTER

(75) Inventors: Sheng-Nan Lu, Shulin (TW); Tien-Yueh Hsu, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 0 days.

(21) Appl. No.: 10/413,235

(22) Filed: Apr. 14, 2003

(51) Int. Cl.[7] .............................................. E05C 17/64
(52) U.S. Cl. ........................ 16/340; 16/342; 16/334; 16/335; 248/917; 248/919; 248/918; 361/681
(58) Field of Search .................... 16/340, 337, 334, 16/335, 342; 248/919, 917, 918; 361/681, 680, 682, 683

(56) References Cited

U.S. PATENT DOCUMENTS

| | | | | |
|---|---|---|---|---|
| 5,022,778 A | * | 6/1991 | Lu | 403/120 |
| 5,037,231 A | * | 8/1991 | Kitamura | 403/120 |
| 5,208,944 A | * | 5/1993 | Lu | 16/278 |
| 5,239,731 A | * | 8/1993 | Lu | 16/340 |
| 5,894,633 A | * | 4/1999 | Kaneko | 16/306 |
| 5,987,122 A | * | 11/1999 | Daffara et al. | 379/433.13 |
| 6,108,868 A | * | 8/2000 | Lin | 16/340 |
| 6,481,057 B2 | * | 11/2002 | Lin | 16/340 |
| 6,568,034 B2 | * | 5/2003 | Cho | 16/337 |
| 6,698,063 B2 | * | 3/2004 | Kim et al. | 16/337 |

FOREIGN PATENT DOCUMENTS

JP          2001107941       * 4/2001

* cited by examiner

*Primary Examiner*—Anthony Knight
*Assistant Examiner*—Mark Williams
(74) *Attorney, Agent, or Firm*—Alan D. Kamrath; Nikolai & Mersereau, P.A.

(57) ABSTRACT

An elastic hinge for a notebook computer has an L-like seat secured on a body of the computer, with a hole of which a section is formed as a numeral "8". A pintle has a first part extending through a barrel, and a second part extending through the hole of the seat. The barrel has two tubular portions for the pintle extending therethrough, and a plate extending from the tubular portions and secured on a monitor of the computer. A torsional spring is provided outside the second part. When a locking member of the computer is released, under the elastic force of the torsional spring, the pintle will be rotated to automatically raise the monitor about an angle of 30° relative to the body of the computer.

5 Claims, 7 Drawing Sheets

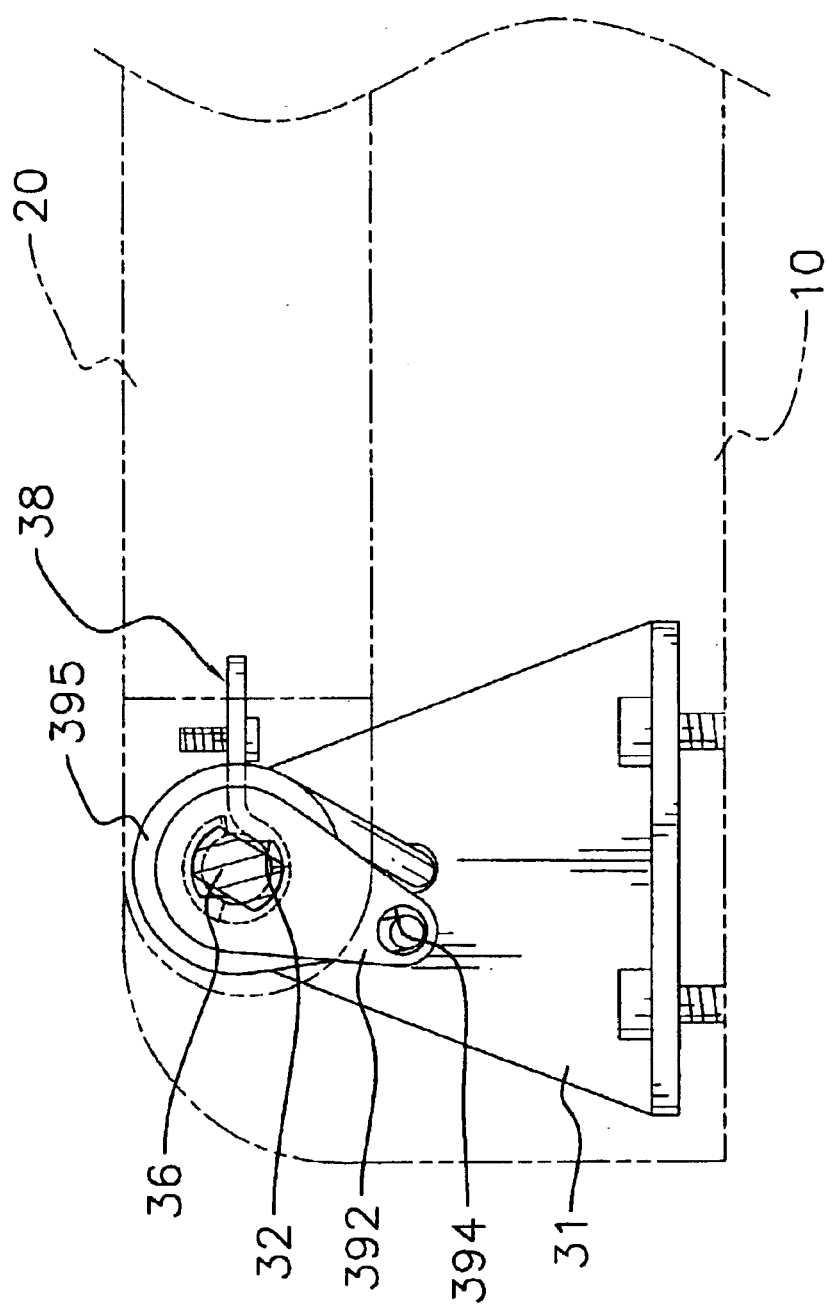

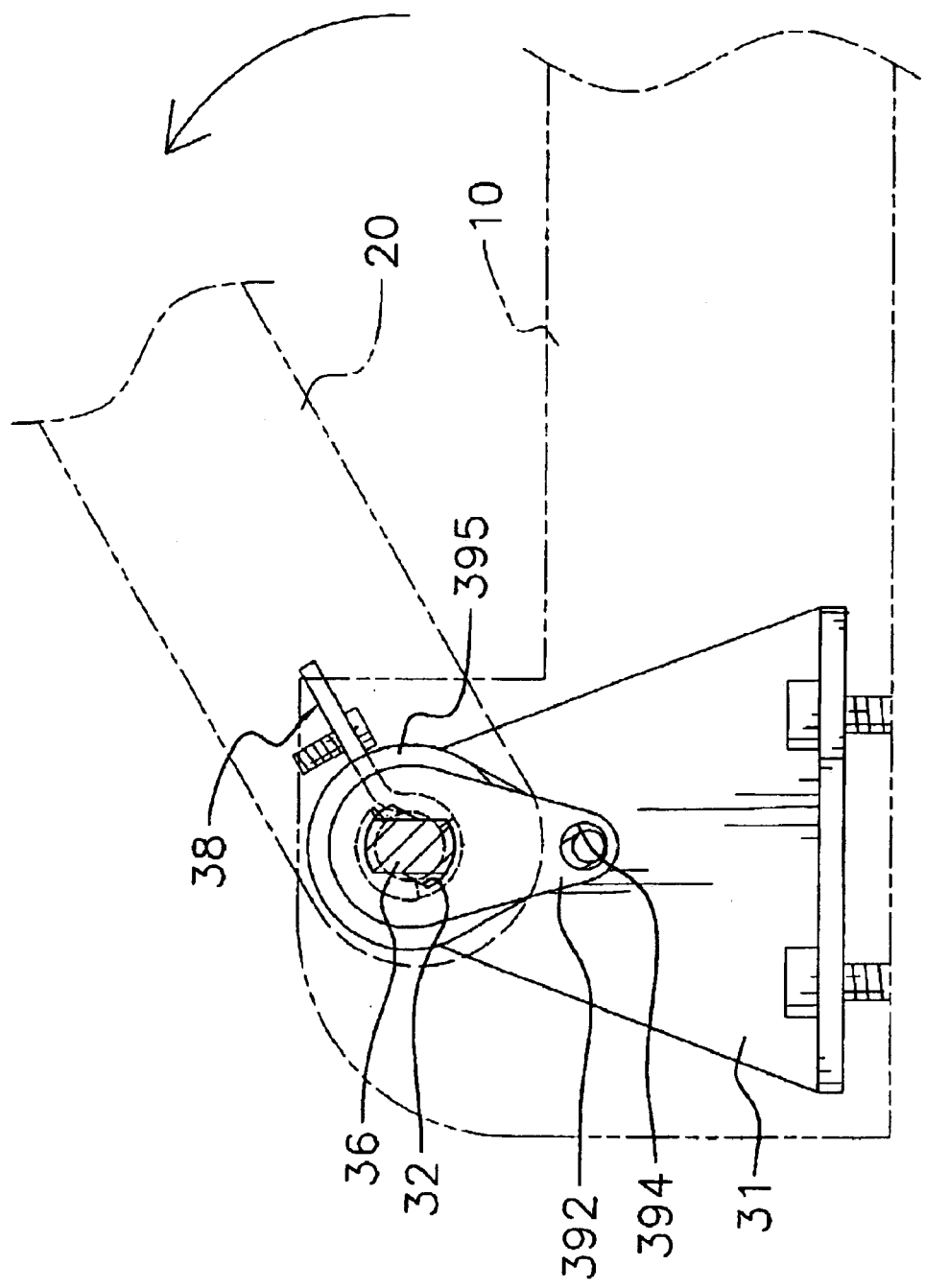

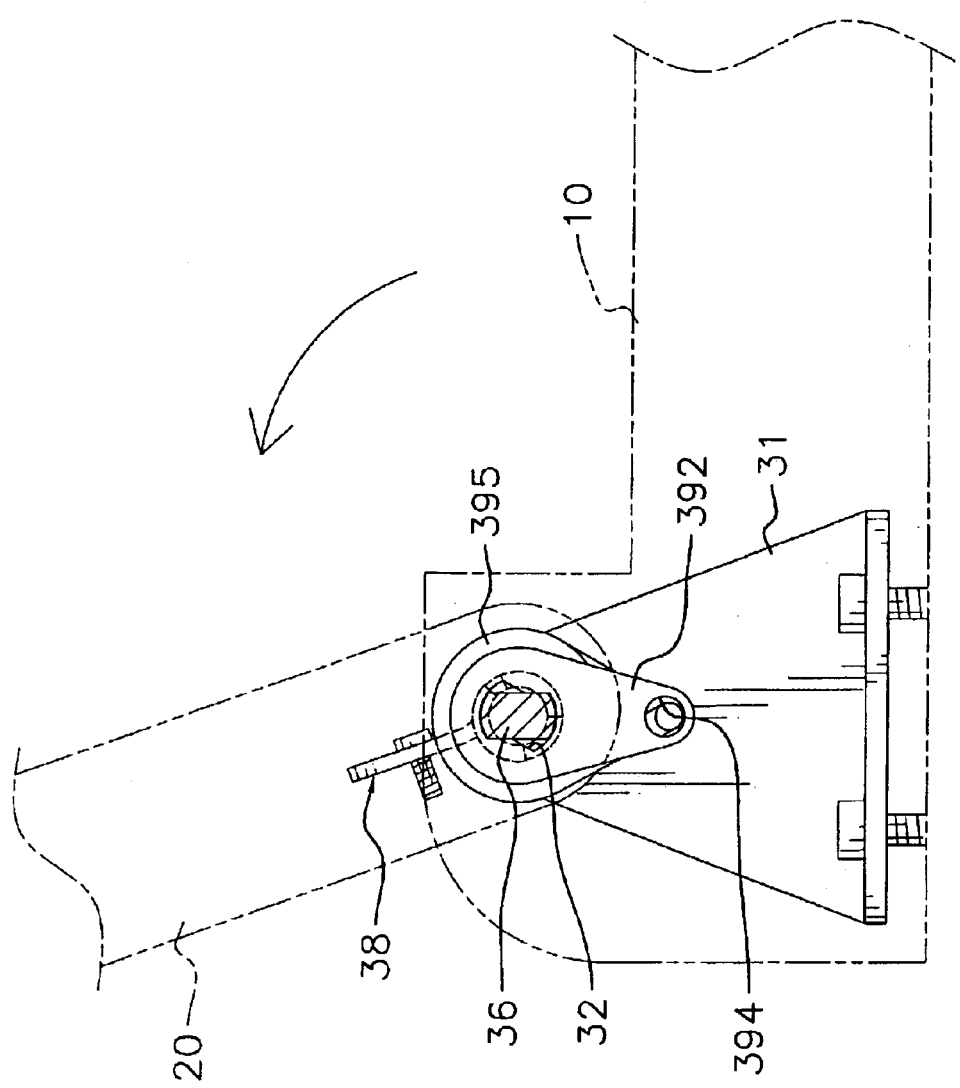

ELASTIC HINGE FOR A NOTEBOOK COMPUTER

BACKGROUND OF THE INVENTION

1. Field of the Invention

The present invention is related to an elastic hinge for a notebook computer, and more particularly to a hinge which has an elastic force to automatically raise a monitor of the notebook computer.

2. Description of Related Art

A notebook computer comprises a body and a monitor pivotally mounted on the body by hinges. When the computer is closed, the monitor abuts the body and is fastened by a locking member.

However, the conventional hinge does not provide an elastic force to slightly raise the monitor when a user wants to open the computer, and the user may fumble in trying to separate the two hinged portions.

Therefore, the invention provides a hinge for a notebook computer to mitigate and/or obviate the aforementioned problems.

SUMMARY OF THE INVENTION

The main objective of the invention is to provide a hinge for a notebook computer which can provide an elastic force to slightly raise a monitor when a locking member of the computer is released.

Other objectives, advantages and novel features of the invention will become more apparent from the following detailed description when taken in conjunction with the accompanying drawings.

BRIEF DESCRIPTION OF THE DRAWINGS

FIG. 5 is a schematic side view of the elastic hinge when a monitor of the notebook computer is locked to abut a body of the notebook computer;

FIG. 6 is a schematic side view of the elastic hinge when the monitor is released to automatically raise; and FIG. 7 is a schematic side view of the elastic hinge when monitor is pivoted upwards.

DETAILED DESCRIPTION OF THE PREFERRED EMBODIMENT

Figure 4:
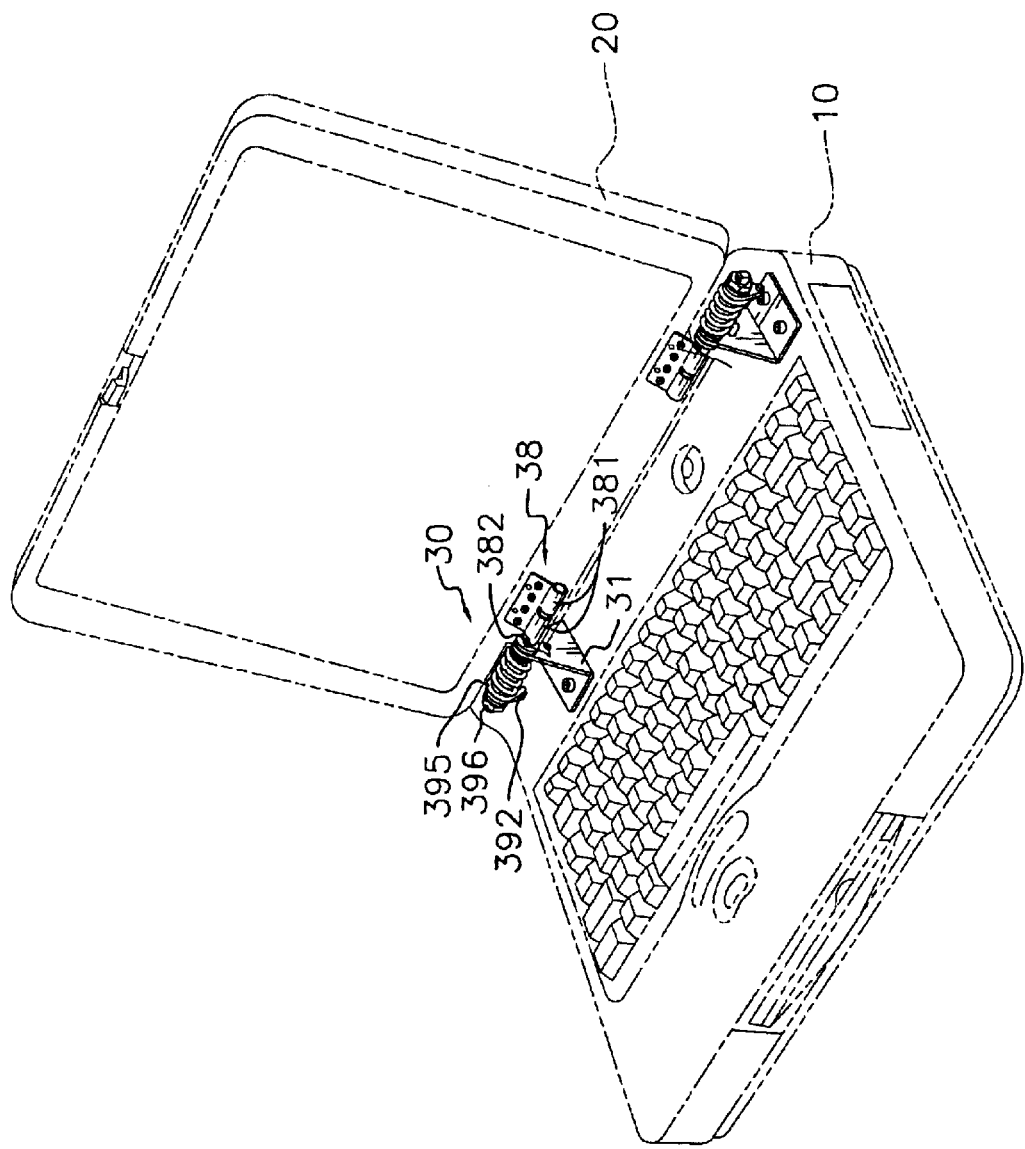
FIG. 4 is a schematic perspective view of a notebook computer assembled with the elastic hinges in accordance with the invention.

Referring to FIG. 4, a notebook computer has a monitor (20) pivotally mounted on a body (10) by two elastic hinges (30) in accordance with the present invention.

Figure 1:
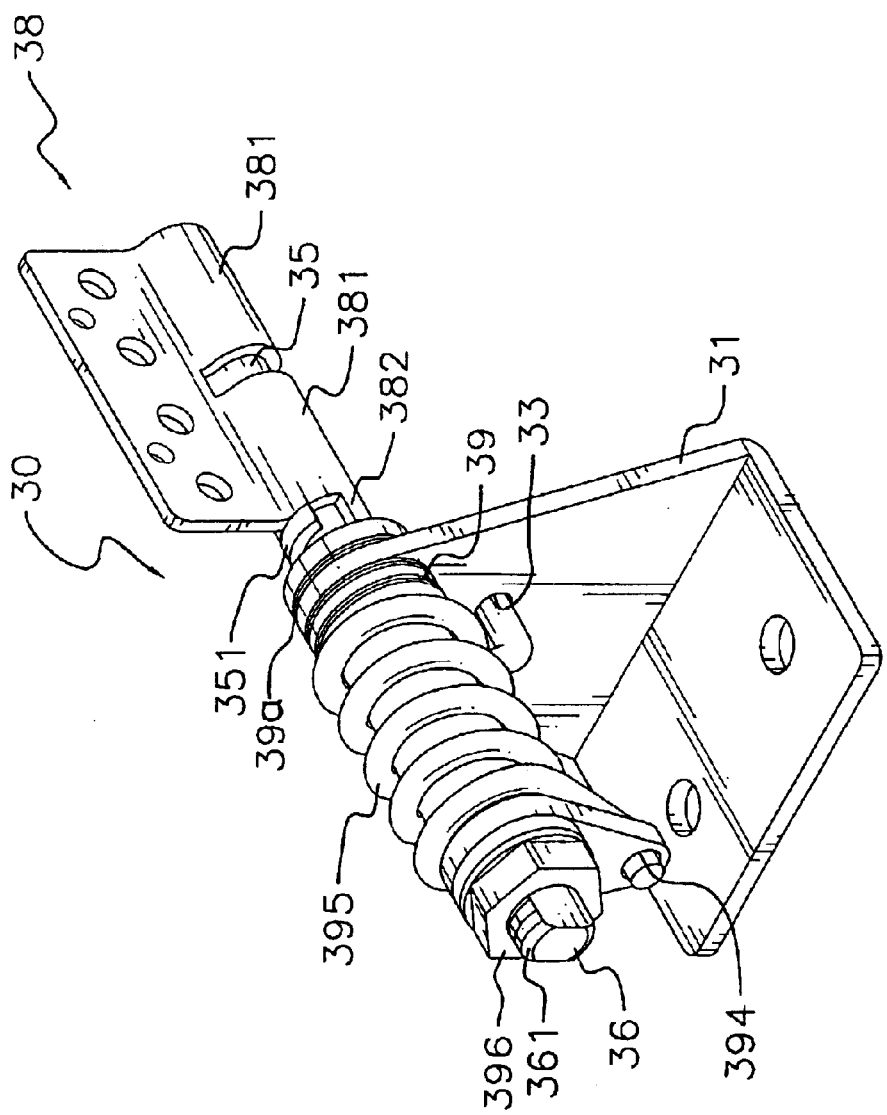
FIG. 1 is a perspective view of an elastic hinge for a notebook computer in accordance with the invention.
Figure 2:
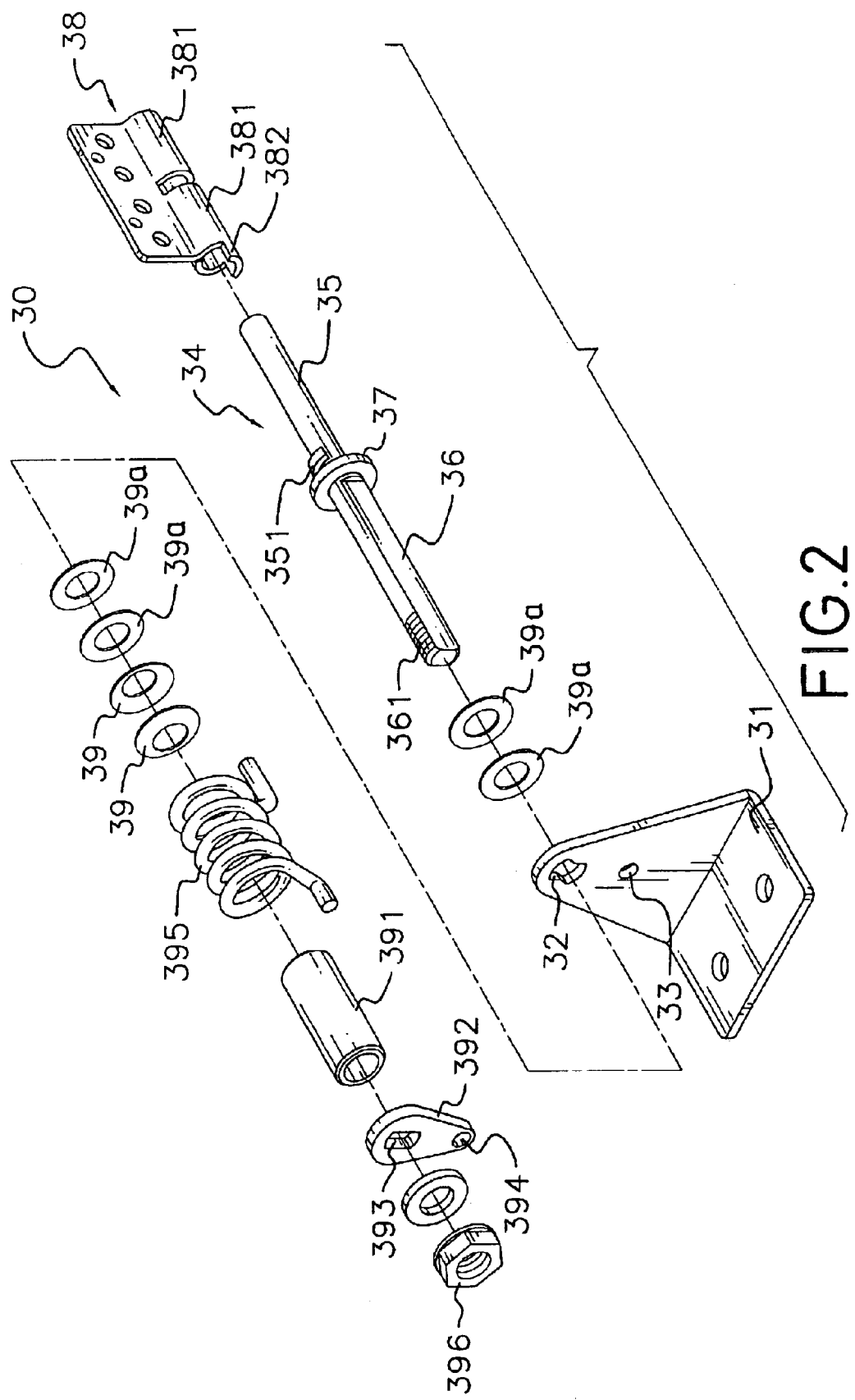
FIG. 2 is an exploded perspective view of the elastic hinge.
Figure 3:
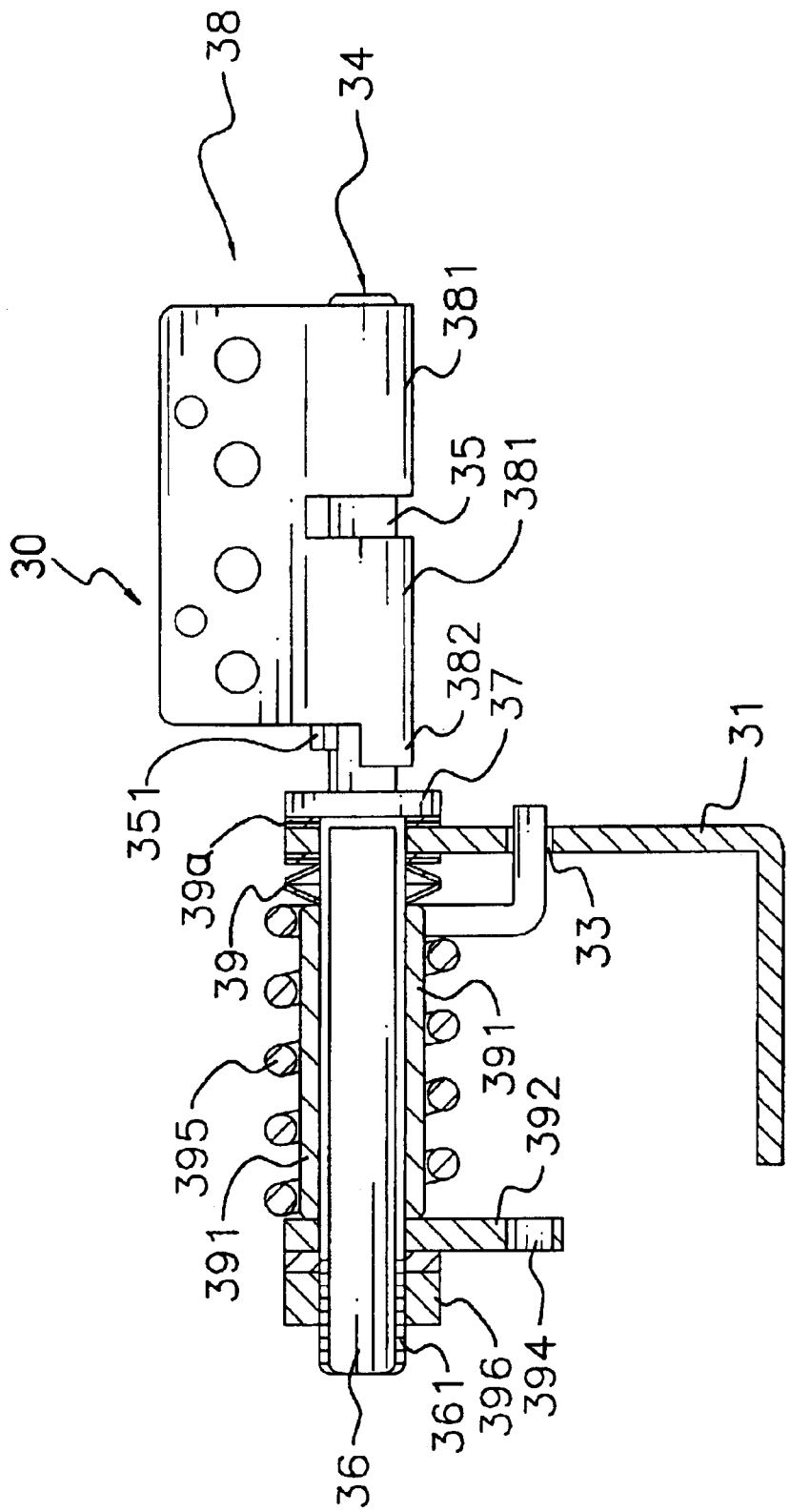
FIG. 3 is a sectional view of the elastic hinge.

Referring to FIGS. 1–3, the elastic hinge (30) has an L-like seat (31) formed with a lateral portion and an upright portion. The lateral portion of the seat (31) is installed on the body (10). A hole (32), of which a section is formed as a numeral "8", is defined through the upright portion of the seat (31), and a first aperture (33) is defined below the bole (32).

A pintle (34) has a first part (35) with a circular section, and a second part (36) with a non-circular section extending through the bole (32). A flange (37) is formed between the first part (35) and the second part (36). A protrusion (351) is formed at an outer periphery of the first part (35) and adjacent to the flange (37). A thread (361) is formed at an end of the pintle (34) away from the flange (37).

A barrel (38) is rotatably provided outside the first part (35) of the pintle (34). The barrel (38) has two tubular portions (381) aligned with each other for the first part (35) extending through the barrel (38), and a plate (not numbered) extending from the tubular portions (381) and fastened on the monitor (20). A lug (382) is formed at an end of the tubular portion (381) facing the flange (38) and can abut the protrusion (351).

A sleeve (391) is provided outside the second part (36) of the pintle (34), and a nut (396) is engaged with the thread (361) to fasten the sleeve (391). A fastening piece (392) is provided outside the second part (36) and between the nut (396) and the sleeve (391). The fastening piece (392) has a rectangular hole (393) for the second part (36) extending therethrough, and a second aperture (394) defined below the rectangular hole (393).

A torsional spring (395) is provided outside the sleeve (391), and has two ends (not numbered) respectively inserted in the first and second apertures (33, 394). A pair of resilient dished washers (39) and a pair of washers (39a) are in turn provided between the sleeve (391) and the seat (31). Another pair of washers (39a) is provided between the seat (31) and the flange (37).

Referring to FIG. 5, when the monitor (20) of the notebook computer is abutted the body (10) and fastened by a locking member (not shown or numbered), the second part (36) of the pintle (34) is blocked by a front protruded inner wall of the hole (32), and the torsional spring (395) is compressed. At the same time, the lug (382) is abutted the protrusion (351).

Referring to FIG. 6, when the locking member is released, under the force of the torsional spring (395), the pintle (34) is rotated counter-clockwise until the second part (36) is blocked by a rear protruded inner wall of the hole (32) to raise the monitor (20) about an angle of 30° relative to the body of the computer.

Referring to FIGS. 4 and 7, afterwards, the barrel (38) can be rotated about the first part (35) of the pintle (34) to further raise the monitor (20). During this process, the pintle (34) is fixed because of the blocked second part (36).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An elastic hinge for a notebook computer, the notebook computer having a body (10) and a monitor (20), the hinge comprising:

an L-like seat (31) formed with a lateral portion secured on the body (10) of the computer, and an upright portion having a hole (32), of which a section is formed as a numeral "8", and a first aperture (33) defined below the hole (32);

a pintle (34) having a first part (35) with a circular section, a second part (36) with a non-circular section extending through the hole (32) of the seat (31), a flange (37)

formed between the first part (35) and the second part (36), and a thread (361) formed at an end of the second part (36) away from the flange (37);

a barrel (38) having two tubular portions (381) aligned with each other for the second part (36) of the pintle (34) extending therethrough, and a plate extending from the tubular portions (381) and secured on the monitor (20) of the computer;

a fastening piece (392) having a rectangular hole (393) for the second part (36) extending therethrough, and a second aperture (394) defined below the rectangular hole (393);

a torsional spring (395) provided outside the second part (36) with two ends respectively inserted in the first aperture (33) and the second aperture (394); and a nut (396) engaged with the thread (361) to secure the fastening piece (392) and the torsional spring (395) on the pintle (34).

2. The elastic hinge as claimed in claim 1, wherein the pintle (34) has a protrusion (351) formed adjacent to the flange (37), and the barrel (38) has a lug (382), to abut the protrusion (351) and formed at an end of the tubular portion (381) facing the flange (38).

3. The elastic hinge as claimed in claim 1 further comprising a sleeve (391) provided between the torsional spring (395) and the second part (36) of the pintle (34).

4. The elastic hinge as claimed in claim 3 further comprising a pair of resilient dished washers (39) provided outside the second part (36) and between the sleeve (391) and the upright portion of the seat (31).

5. The elastic hinge as claimed in claim 4 further comprising a pair of washers (39*a*) provided outside the second part (36) and between the resilient dished washers (39) and the upright portion of the seat (31), and another pair of washers (39*a*) provided outside the first part (35) and between the upright portion of the seat (31) and the flange (37).

* * * * *